United States Patent [19]

Paca

[11] 4,040,726
[45] Aug. 9, 1977

[54] SEE-THROUGH MIRROR WITH SPACED REFLECTIVE STRIPS

[76] Inventor: Francis B. Paca, 1902 Leo Lane, Alexandria, Va. 22308

[21] Appl. No.: 666,366

[22] Filed: Mar. 12, 1976

[51] Int. Cl.² .................. G02B 5/08; G02B 27/14
[52] U.S. Cl. .................. 350/288; 350/279; 350/172
[58] Field of Search .......... 350/288, 278, 174, 304, 350/299, 292, 279, 280, 291, 172

[56] References Cited
U.S. PATENT DOCUMENTS

| 2,796,805 | 6/1957 | Morgan | 350/174 |
|---|---|---|---|
| 3,510,206 | 5/1970 | Smith | 350/288 |

FOREIGN PATENT DOCUMENTS

| 216,456 | 8/1941 | Switzerland | 350/288 |
|---|---|---|---|
| 619,360 | 3/1949 | United Kingdom | 350/278 |

*Primary Examiner*—Jon W. Henry
*Attorney, Agent, or Firm*—Peter A. Taucher; John E. McRae; Nathan Edelberg

[57] ABSTRACT

A rear view mirror for an automotive vehicle, wherein the light-reflective surface is interrupted by at least one transparent segmental surface area, whereby the driver is enabled to directly view terrain that would otherwise be obstructed by the mirror. The transparent surface areas are preferably spaced on centers by a distance which has a relationship to an average driver's interpupillary distance so that the driver can simultaneously view the light-reflective surface and transparent surface.

3 Claims, 9 Drawing Figures

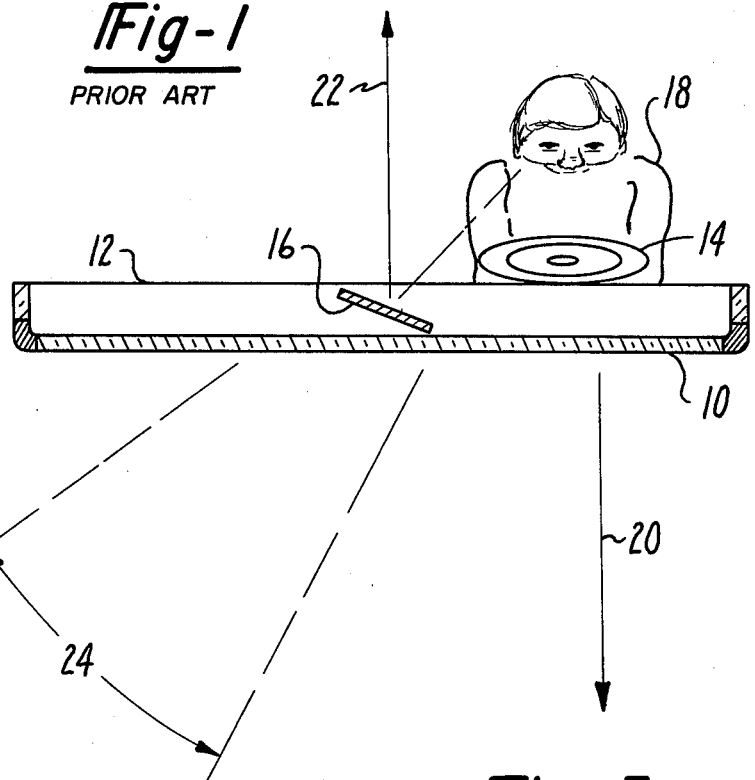
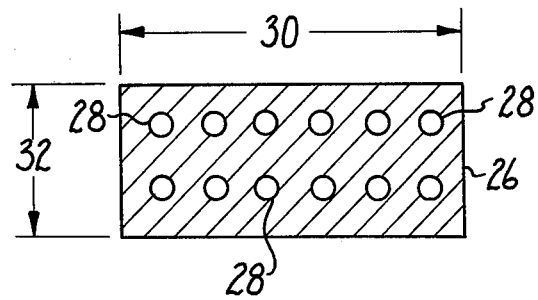
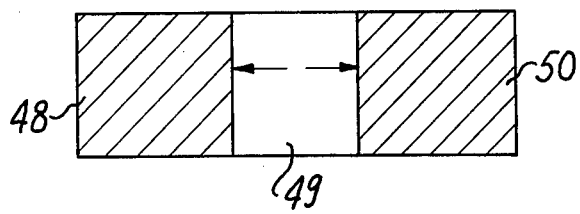
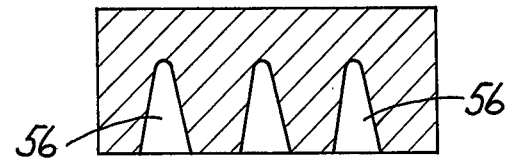

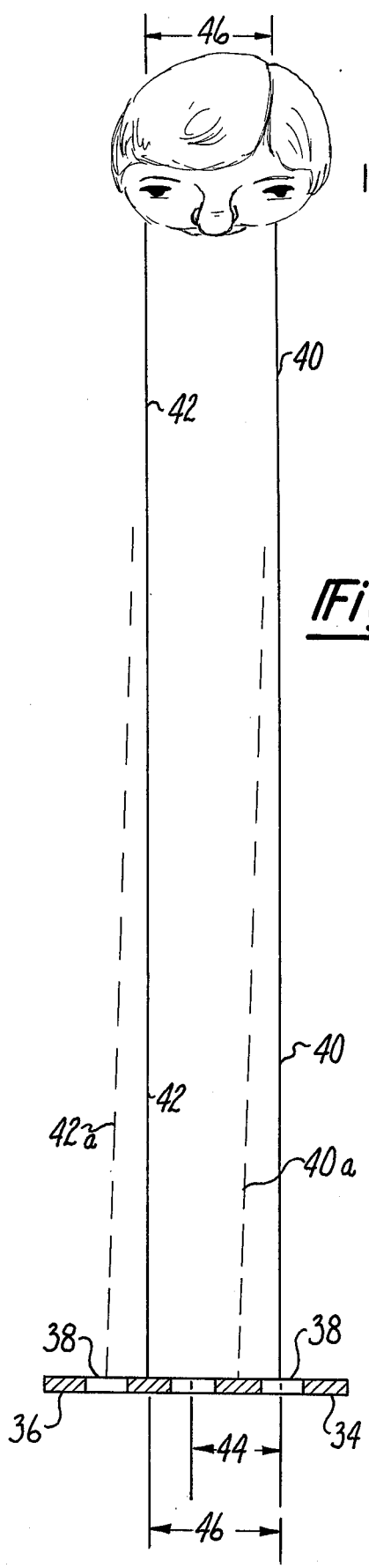
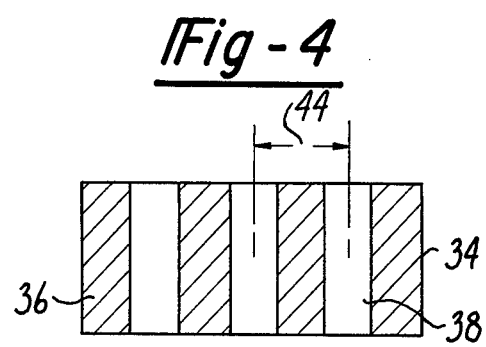
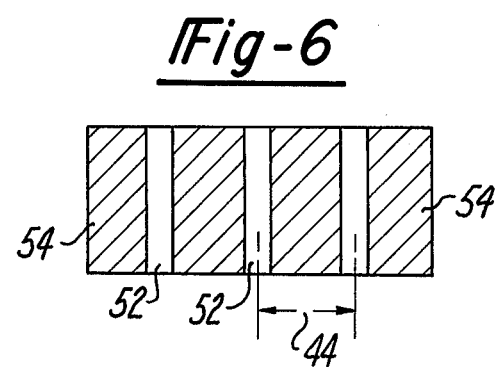
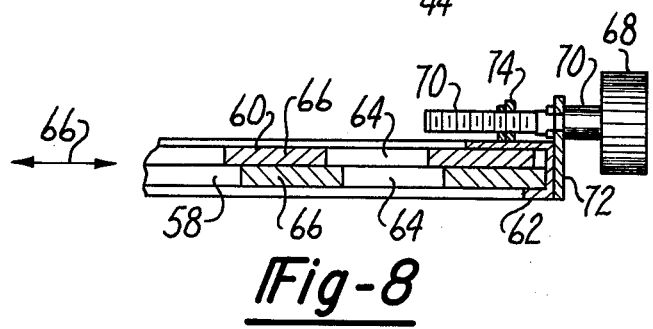
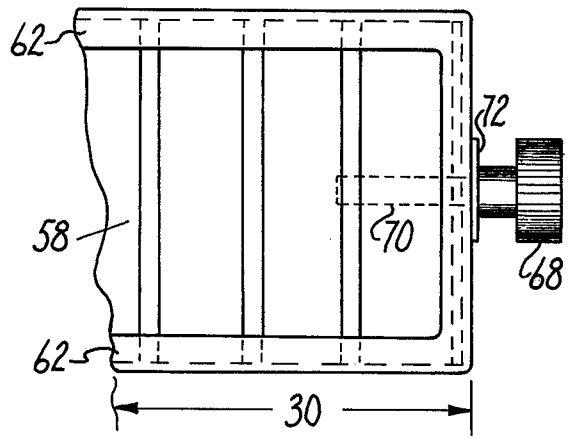

SEE-THROUGH MIRROR WITH SPACED REFLECTIVE STRIPS

The invention described herein may be manufactured, used, and licensed by or for the Government for governmental purposes without payment to me of any royalty thereon.

BACKGROUND AND SUMMARY OF THE INVENTION

Rear view mirrors for use inside automotive vehicles (trucks, passenger cars, etc.) are typically rectangular mirrors of about 3 by 6 inches in size located near the front windshield. Such mirrors must be at least this minimum dimension to provide a view of what is taking place behind the vehicle; however with such dimensions the mirrors tend to block a portion of the forward view of the driver. For many combinations of drivers, vehicles and mirrors this blocking of a portion of the forward view is of little consequence. However there are a substantial number of adverse combinations of drivers, vehicles and mirrors in which the forward activity blocked out by the rear view mirror can have serious consequences. The "block-out" problem is particularly serious with compact small-size vehicles when driven by tall people. In such situations the mirror is at or below the driver's eye level and in relatively close proximity to the driver's eye. Accordingly the driver has difficulty in seeing around or under the mirror to view activity starboard of the vehicle.

Conventional mirrors are capable of limited movement up and down for enabling tall or short drivers to obtain a view of the terrain rearwardly of the vehicle. Therefore, by using this mirror adjustment it may be possible to at least partially alleviate the forward blocking problem. However the requirement for rear view performance limits the extent of up-down adjustment that can be effectively utilized.

The block out problem can be overcome by incorporating a periscope system of mirrors into the vehicle roof. However such a system is rather costly and only partially effective from a rear view performance standpoint because the driver is required to shift his eye position to switch from forward viewing to rearward viewing.

It is also known to provide "see-through" semi-transparent mirrors in airplanes and other locations. Such mirrors have a relatively thin semi-transparent silver coating thereon that permits a person to simultaneously see a "forward" image through the semi-transparent film, and also a "rearward" image by way of the reflective surface. Such mirrors are believed to suffer in that the semi-transparent coating cuts down on the intensity of transmitted light and reflected light; both the direct image and reflected image appear relatively dark and indistinct.

The present invention proposes a relatively low cost solution to the "mirror block-out" problem. In one of its forms the invention comprises a conventional rear view mirror modified so that selected areas thereof are left unsilvered. These unsilvered areas provide see-through apertures that enable the driver to view forward terrain that would otherwise be blocked-out by the mirror. The transparent unsilvered areas are preferably configured as vertical strip-like areas spaced apart by a distance that has a relationship to the average adult person's interpupillary distance, i.e. the distance between the pupils of the driver's left and right eyes. The typical interpupillary distance is about 60 millimeters.

The preferred spacing between transparent areas is such that the driver is enabled to have one eye focused on a reflective surface and the other eye focused on a transparent surface, thereby permitting simultaneous rearward viewing and forward viewing. The arrangement in effect means that the eye can reconstruct objects behind the mirror as well as objects reflected by the mirror.

THE DRAWINGS

FIG. 1 is a top plan view schematically illustrating a conventional automotive rear view mirror installation.

FIG. 2 diagrammatically illustrates how a driver is enabled to simultaneously see forwardly through a mirror and rearwardly via the reflective surface.

FIGS. 3, 4, 5, 6 and 7 illustrate various rear view mirror configurations embodying the present invention.

FIGS. 8 and 9 are fragmentary sectional and front elevational views of another embodiment of the invention.

FIG. 1 shows a conventional automotive vehicle construction comprising a front windshield 10, dashboard 12, steering wheel 14, and conventional rear view mirror 16 located approximately at "eye-level" elevation above the dashboard. The driver 18 is enabled to view the area immediately in front of the vehicle, as shown by directional arrow 20. The driver is also enabled to view the area behind the vehicle, as by gazing into mirror 16; numeral 22 designates the rear view directional path. Mirror 16 may be adjustable to tilt from side-to-side and also up-and-down, whereby either tall or short drivers are enabled to view a substantial percentage of the area or activity behind the vehicle.

It will be seen that mirror 16 exerts a "blocking" effect against the driver obtaining a forward view of the terrain located starboard of the vehicle, i.e. the area designated generally by numeral 24. The blocking effect would be particularly troublesome in small compact vehicles wherein the rear view mirror is located in relatively close proximity to the driver's eye. The closer the obstruction is to the eye the greater is its blocking effect.

FIG. 3 illustrates a partially transparent rear view mirror devised to avoid the blocking effect depicted by numeral 24. In FIG. 3 the sectioned areas 26 designate reflective surface areas of the mirror; the non-sectioned areas 28 designate transparent "see-through" areas. The mirror may be formed by conventional procedures, wherein the back surface of a glass panel is provided with a reflective silver coating or film; temporary masks may be provided on areas of the glass panel during the film deposition operation. The masks would of course be stripped off prior to installation of the mirror in the vehicle. The transparent areas of the panel can be provided with transparent film coatings for tinting or color filter purposes, similar to coatings used on windshields or eye glasses. Alternate procedures to form the transparent segments may include removal of portions of the glass or construction of the mirror without glass in designated areas.

The FIG. 3 mirror would be used with its longest dimension 30 extending horizontally and its shortest "height" dimension 32 extending vertically. Transparent areas 28 provide a discontinuous view of the forward terrain that enables the driver to partially reconstruct the area or activity that would otherwise be blocked out by the mirror. Reflective areas 26 are substantially continuous in spite of the presence of transparent areas 28; therefore reflective areas 26 provide a relatively clear view of the area behind the vehicle.

Referring to FIG. 2, there is shown a driver 18 looking toward a rear view mirror 34 that has light-reflective areas or strips 36 and interspersed transparent areas or strips 38. A frontal view of the mirror is shown in FIG. 4; the strips appear as vertical strips (as they would be viewed by the driver). Transparent vertical strip areas 38 are so spaced that when the sight line 40 from the driver's left eye is passing through a transparent area of the mirror the sight line 42 from the driver's right eye will encounter a reflective area of the mirror. Accordingly, at that instant the driver is enabled to simultaneously view the forward terrain beyond the mirror and the rearward terrain back of the vehicle, i.e. behind the driver. Should the driver shift his gaze slightly the left sight line 40a will encounter a reflective mirror surface and the right sight line 42a will pass through a transparent mirror surface. Thus, he will be able to simultaneously see the forward terrain with one eye and the rearward terrain with the other eye. This "explanation" is of course a generalized theory as to the optical effects taking place. In actual practice each eye will focus on an area rather than a single sight line. Therefore, the optical impressions transmitted to the person's brain are probably a blend or superimposition of multiple images approximating the illustrated effect.

The spacing of the centerlines for the various transparent areas 38 in the FIG. 2 mirror is designated by numeral 44. The driver's interpupillary distance is designated by numeral 46. Distance 44 is in this instance two thirds distance 46. This dimensional relationship ensures that the driver's left and right eyes will be out of sequence during most of the time, e.g. the left eye will usually see a reflective surface while the right eye is seeing a transparent surface.

Interpupillary distance 46 is not the same for all adult persons. It can for example be as small as 45 millimeters or as large as 75 millimeters, the average thereby being 60 millimeters. However these are extreme values; for the vast majority of adult persons the interpupillary distance is in a relatively narrow range intermediate these values.

Preliminary tests indicate that the driver more easily forms a proper image of rearward details when the transparent area spacing 44 is twice the interpupillary spacing 46, or is an odd fraction of the interpupillary spacing 46. Thus, in experiments with a mirror comprised or four reflective sections and three interspersed transparent sections, each having a width of 25 millimeters, the rearward image lacked optimum detail or focus. That particular mirror had a "transparent area" centerline spacing of 50 millimeters, which is believed to be too close to the interpupillary distance; apparently with such spacing, at any one point in time the driver's left and right eyes tended to focus on either the reflective area or the transparent area, not both areas. Presumably the transmitted images were not sufficient to provide a clear reconstruction of both the "reflected" scene and "transmitted" scene. Experiments indicate that best overall performance (forward and rearward) is obtained when the centerline spacing of the transparent areas is equal to twice the interpupillary distance or is equal to an odd fraction of the interpupillary distance; e.g. two-thirds or two-fifths, etc. Even fractions, such as one-half or one-fourth, will apparently not work so well. Transparent area centerline spacings that are either twice or odd fractions of the interpupillary spacings are believed to provide the "out-of-sequence" viewing that provides both images (reflected and see-through).

FIG. 5 illustrates a mirror having two reflective areas 48 and 50, and an intervening transparent area 49. The width dimension A of area 49 corresponds approximately to the interpupillary distance 46. (i.e. the spacing between centerlines of transparent zones or segments is twice the interpupillary distance 46.) Accordingly, when the average driver's left eye is scanning reflective surface area 50 his right eye is automatically caused to scan the transparent area 49. This structure thus provides the out-of-sequence viewing that is believed to improve overall response. The FIG. 5 structure might also be beneficial in that each of the three segmental areas 48, 49 or 50 provides a relatively large percentage of the total picture. Thus, the number of picture interruptions is reduced, and the picture continuity (within each segmental area) is increased. With a structure built as shown in FIG. 5 (each segment having a width of about 50 millimeters), it was rather easy to form a relatively complete reflected image; the see-through image was in fact more difficult to visualize, possibly because the total reflected surface area is considerably greater than the total see-through area. The FIG. 5 mirror construction is believed to be an improvement over conventional rear view mirrors not having see-through capability.

FIG. 6 illustrates a mirror wherein the transparent strip areas 52 are narrower than the reflective strip surface areas 54. The transparent surface centerline spacing 44 of FIGS. 2 and 4 is retained. Accordingly the out-of-sequence viewer action is retained.

FIG. 7 illustrates a mirror wherein the transparent strip areas 56 have triangular configurations. The area above the triangular apices is entirely and continuously light-relective. Consequently the upper portion of the reflected picture has very good continuity from one side edge of the mirror to the other. Centerline spacing 44 is retained.

Some drivers would or might find the see-through feature annoying or unneccessary. Also, some drivers, with relatively large or relatively small interpupillary spacings, might find the "standard" see-through constructions of FIGS. 3 through 7 unsuitable to their vision capabilities. It is believed possible to form an "adjustable" structure that takes into account the desires of these non-users or non-average users. One form that the adjustable structure might take is shown in FIGS. 8 and 9. The mirror there shown comprises two glass panels 58 and 60 contained within a surrounding metal or plastic frame 62. Each panel is equipped with alternating transparent areas 64 and light-reflecting areas 66. Panel 58 may have a slightly longer transverse dimension 30 than panel 60, such that panel 58 is immovably retained in frame 62 whereas panel 60 is free to slide back and forth as denoted by arrow 66.

Adjustable movement of panel 60 in the arrow 66 direction may be provided by manual rotation of an accessible knob 68 affixed to screw 70 or by other means. The screw is rotatably mounted on or in a suitable bracket 72 carried by frame 62. Threaded portions of the screw mesh with a nut member 74 affixed to panel 60. Consequently, manual turning of knob 68 produces a slidable motion of panel 60 in the arrow 66 path.

Preferably, screw means 70 is of sufficient length to permit panel 60 to move from a first condition wherein the effective exposed transparent area is approximately the same as the effective exposed reflective area, to a second condition wherein the entire effective surface is light-reflective. The effective area is here considered as the exposed area viewed by the driver; in FIG. 9 the effective area would be the exposed area encompassed by frame 62.

It will be seen that in the condition of FIG. 8 the transparent areas in panel 60 are in substantial alignment with the transparent areas in panel 58. Assuming the area of each reflective strip 66 to be the same as the area of each transparent strip 64, then in the FIG. 8 condition the total effective transparent area is slightly less than the total effective exposed reflective area. Movement of panel 60 to the right (FIG. 8) will increase the exposed transparent area and decrease the exposed reflective area. Movement of panel 60 to the left will decrease the transparent area while increasing the reflective area. Sufficient turn of knob 68 will eliminate the transparent areas, thereby making the entire surface area light-reflective.

When the surface is entirely light-reflective the see-through function is omitted. The mirror then functions as a conventional mirror, thereby permitting usage by non-users, i.e. persons who do not wish to use the see-through feature. Knob 68 can be used to vary the relative areas of the light-transmitting and light-reflecting portions in accordance with the desires of non-average users. The forward see-through image tends to be more distinct as the transparent area is increased and less distinct as the transparent area is decreased. Adjustment of knob 68 may therefore be used to vary the overall performance of the mirror according to what type of see-through image the user desires or requires.

I wish it to be understood that I do not desire to be limited to the exact details of construction shown and described for obvious modifications will occur to a person skilled in the art.

I claim:

1. In an automotive vehicle, a rear view mirror located in near adjacency to the vehicle windshield for observation from the driver's seat; said rear view mirror having a light-reflective surface that is interrupted at a number of spaced points thereacross so that the mirror is subdivided into contiguous interspersed vertical reflective strips and vertical transparent strips; the transverse width of each transparent strip being approximately the same as the transverse width of each reflective strip; each transparent strip and reflective strip having an imaginary vertical centerline; the centerlines of successive transparent strips being spaced apart by a distance equal to the average driver interpupillary distance of 60 millimeters times the factor X, where X is selected from the numerical grouping consisting of 2, 2/3, 2/5 and 2/7; each strip having an appreciable recognizable width whereby an average driver is enabled to simultaneously train one eye on a transparent strip and the other eye on a reflective strip.

2. The rear view mirror of claim 1 wherein each transparent strip has a substantially triangular configuration arranged with the base of the triangle at the bottom edge of the mirror; the width of each transparent strip being defined as the width of the corresponding base; the width of each reflective strip being defined as the width measured at the bottom edge of the mirror between adjacent ones of the aforementioned bases.

3. The rear view mirror of claim 2 wherein each transparent triangle terminates a slight distance below the upper edge of the mirror, leaving a narrow continuous reflective area along the mirror upper edge for continuous view by the driver.

* * * * *